United States Patent [19]

Spöring

[11] Patent Number: 4,471,011

[45] Date of Patent: Sep. 11, 1984

[54] MULTI-LAYER PRINTING BLANKET

[75] Inventor: Günter Spöring, Northeim, Fed. Rep. of Germany

[73] Assignee: Continental Gummi-Werke Aktiengesellschaft, Hanover, Fed. Rep. of Germany

[21] Appl. No.: 433,395

[22] Filed: Oct. 8, 1982

[30] Foreign Application Priority Data

Oct. 9, 1981 [DE] Fed. Rep. of Germany ....... 3140122

[51] Int. Cl.3 .......... B32B 1/04

[52] U.S. Cl. .......... 428/68; 428/246; 428/250; 428/909

[58] Field of Search .......... 428/909, 68, 246, 250

[56] References Cited

U.S. PATENT DOCUMENTS

| | | | |
|---|---|---|---|
| 4,093,764 | 6/1978 | Duckett et al. | 428/909 |
| 4,350,735 | 9/1982 | Saitoh | 428/909 |
| 4,388,363 | 6/1983 | Fountain | 428/909 |

*Primary Examiner*—James J. Bell
*Attorney, Agent, or Firm*—Becker & Becker, Inc.

[57] ABSTRACT

A multi-layer printing blanket having a reinforcing section as a substructure which is composed of one or more fabric layers with rubberized layers disposed therebetween, and having a cover which can include a compression layer, a fabric layer, and a top or cover layer. A thin rubberized coating is worked-in on that side of the reinforcing section remote from the cover. This rubberized coating is composed on the basis of such a rubber type which is as swell-resistant as possible against water, conventional solvents, and colors or inks employed in connection with the printing blanket.

14 Claims, 2 Drawing Figures

MULTI-LAYER PRINTING BLANKET

The present invention relates to a multi-layer printing blanket having a reinforcing section or substructure which is composed of one or more fabric layers with rubberized layers disposed therebetween, and having a cover which can include a compression layer, a fabric layer, and a top or cover layer.

Such printing blankets are employed in offset printing and in high-pressure or relief printing. In offset printing, during the printing procedure and during cleaning of the mounted printing blankets, media such as printing ink, washing agents, and water, are used which can effect a more or less intense swelling when they penetrate into the printing blanket. In order to prevent such a swelling, the cover qualities of a printing blanket are as resistant as possible to swelling by the mentioned media. Thus, with the employment of oil-base inks, rubber mixtures are used which are based on nitrile rubber, which is oil-resistant. Likewise, it is known when using inks having an ester or ketone base, to use mixtures resistant thereagainst and based on EPDM rubber in the cover of a printing blanket. Consequently, hardly any danger threatens a printing blanket from the top or outer side, i.e. from the cover side, when it is acted upon by the mentioned media.

A further endangered location is the edges of a printing blanket, which, as known, is made in large sheets and is first cut to the desired size by the user. In order to prevent a lateral penetration of the mentioned media into the substructure of the printing blanket, which has relatively swell-sensitive fabric layers, rubber intermediate layers, or microporous intermediate layers, the cut edges and the adjacent edges of known printing blankets are coated with a swell-resistant rubber solution. Further measures against swelling of parts of a printing blanket were not considered necessary with known blankets.

Time-consuming tests, however, have led to the result that in spite of a prescribed mounting of a printing blanket on a cylinder, and in spite of the described protective measures, damage is constantly encountered along the edges of a printing blanket because of the swelling. It was discovered that these undesired swellings are caused by media, which come through very fine openings between the edges of a printing blanket and the surface of a cylinder, pass to the relatively sensitive back or bottom of the printing blanket, and there attack the fabric substructure. This penetration of damaging media into the back of the mounted printing blanket is further intensified with compressible printing blankets by a certain pumping effect during the printing operation.

The local swelling of parts of the printing blanket, which swelling initially is predominantly located in the edge regions of the printing blanket and gradually extends out to encompass a larger area, results in an increase in thickness, which in turn results in a higher loading in the printing gap, and hence a premature wear and failure of the printing blankets and printing plates. Additionally, machine parts such as bearings and cutting rings are endangered by an increased and primarily non-uniform loading.

It is therefore an object of the present invention to produce a printing blanket for offset and relief printing which is protected as extensively as possible against swelling-agressive media.

BRIEF DESCRIPTION OF THE DRAWING

This object, and other objects and advantages of the present invention, will appear more clearly from the following specification in connection with the accompanying drawing, in which.

Figure 1:
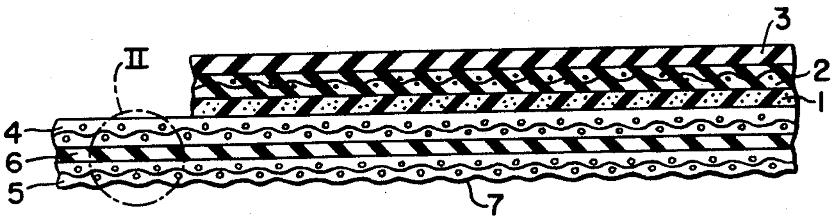
FIG. 1 is a fragmentary, schematic cross-sectional view showing the arrangement of the layers of one inventive embodiment of a printing blanket for offset printing with oil-based colors.

The printing blanket of the present invention is characterized primarily in that on that side of the reinforcing section remote from the cover, a thin rubberized coating is worked-in which is composed on the basis of such a rubber type which is as swell-resistant as possible against water, conventional solvents, and colors or inks utilized in connection with the printing blanket.

Referring now to the drawing in detail, the printing blanket comprises a cover and a reinforcing section (substructure). The cover in this embodiment comprises a compression layer 1, a fabric layer 2, and a top or cover layer 3 as the ink or color transfer layer; the sequence of the layers of the cover is not important in the present invention.

The reinforcing section, which forms the substructure, includes an upper fabric layer 4 and a lower fabric layer 5 of a fabric of low elasticity. The two fabric layers 4,5 are connected with one another by a rubberized layer 6. A thin rubberized coating 7, which is made of a rubber mixture on a basis of nitrile rubber and has a greater hardness than does the rubberized layer 6, is located below the fabric layer 5, i.e. on the remote or bottom side of the printing blanket.

Figure 2:
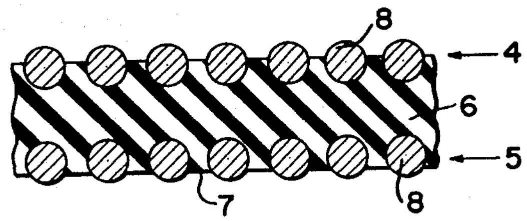
FIG. 2 is a fragmentary cross-sectional enlargement of the encircled region II in FIG. 1.

Parts of the fabric layers 4,5, the rubberized layer 6, and the rubberized coating 7 are illustrated enlarged in FIG. 2, so that individual fabric threads 8 are recognizable in cross section. The rubberized coating 7 is selected so thin, and is forced thoroughly or worked into the lower fabric layer 5 so thorougly, that the surface of the bottom of the printing blanket, at the intersections of fabric threads 8, has dome-like or rounded elevations which are covered by a thin film of the rubberized coating 7. A strong mechanical anchoring of the rubberized coating 7 in the lower fabric layer is obtained due to the penetration of the rubberized coating 7 into the spaces or interstices between the fabric threads 8.

It should be noted that in practice not only is the sealing of the back side of a printing blanket with the aid of a swell-resistant rubber layer of any desired thickness and composition of importance, but also a rubberized coating must be used which also fulfills the remaining requirements of a printing blanket. In particular, specific coefficients of friction of the back or bottom of the printing blanket must be maintained in relation to the steel surface of a cylinder or in relation to the surface of a foil placed below it. Furthermore, a sufficient mechanical stability must be assured between the rubberized coating and the lower fabric layer of the reinforcing section of the printing blanket. This is inventively achieved in that a sufficiently thin rubberized coating is applied not only smoothly or evenly onto the back of the printing blanket, but is also worked into the adjacent fabric layer.

According to one advantageous specific embodiment of the present invention, the rubberized coating is applied so thin onto, and is worked so intensively or deeply into, the lower layer of the printing blanket substructure, that the structure of this fabric layer remains visible. A so-to-speak point-type support or contact of the printing blanket upon the cylinder is hereby attained, whereby the "points" are located at the intersections of two threads of the remote or bottom fabric layer. Due to this feature, and due to the chemical composition of the rubberized coating, coefficients of friction are attained which correspond approximately to those of unsealed bottoms of printing blankets. A uniform tensioning or stressing of the printing blanket on the cylinder surface is therefore possible despite the presence of a sealing rubber coating on the back.

The printing blanket according to the present invention offers the advantages of increased durability and hence life expectancy.

By avoiding different thicknesses because of swelling, more uniform printing characteristics are attained, resulting in an improvement of the completion and contrast values.

When the blanket is used in offset printing with oil-based color or ink, the bottom rubberized coating comprises a rubber on a basis of nitrile rubber with a hardness of between 55 and 90 Shore A. A hardness of approximately 80 Shore A has proven especially good.

The coefficient of friction $\mu$ of the bottom of the printing blanket relative to the surface of a steel cylinder, or possibly relative to a foil (e.g. also of steel) placed therebetween, ranges from 0.05 to 0.25.

The rubberized coating can be applied and worked-in during different stages of the manufacture of the printing blanket, and in different ways. Thus, it is possible to separately (i.e. prior to further assembly) provide the remote layer of the reinforcing section, i.e. the lower fabric layer, with the rubberized coating by dipping or coating processes. Furthermore, the coating can be applied by coating the remote layer, after completing the reinforcing section, or even after connection of the reinforcing section with the cover.

The vulcanization of the rubberized coating can occur not only at temperatures of 80° C. to 160° C., but also at room temperature. According to a preferred manner of production, the rubberized coating, during the vulcanization, experiences a pressure loading of approximately 20 to 40 $N/m^2$, which results in an evenness that positively affects the coefficient of glide or slide.

Good results are obtained for the rubberized coating with rubber mixtures which during application have a viscosity of 20 to 50 Pascal. sec. Furthermore, it can be advantageous to add 0.5 to 5% silicon oil to the rubber mixture for this coating to increase the glide or slide capability.

If the printing blanket is to be employed to print with colors or inks having an ester or ketone base, a rubberized coating on a basis of EPDM rubber (i.e. elastomers made with ethylene-propylene diene monomers) should be used for sealing the back or bottom of the blanket, while otherwise the already indicated points are to be taken into account.

The present invention is, of course, in no way restricted to the specific disclosure of the specification and drawing, but also encompasses any modifications within the scope of the appended claims.

What I claim is:

1. In a multi-layer printing blanket having specific arrangement of component parts including a reinforcing section as a substructure which includes at least one fabric layer with a respective rubberized layer disposed therewith, and having a cover on said reinforcing section, which cover includes at least a top layer; said reinforcing section having one side adjoining said cover, and further side remote from said cover; said printing blanket further having the inprovement therewith which comprises:

a thin rubberized coating that is forced thoroughly into said reinforcing section on said further side thereof remote from said cover by pressure loading for evenness during vulcanization, said rubberized coating being composed on the basis of a rubber which is as swell-resistant as possible to water, conventional solvents, and inks utilized in connection with said printing blanket.

2. A printing blanket according to claim 1, in which said rubberized coating comprises a rubber composed on the basis of nitrile rubber having a Shore A hardness of between 55 and 90.

3. A printing blanket according to claim 2, in which said rubber has a Shore A hardness of 80.

4. A printing blanket according to claim 1, in which the thickness of said rubberized coating on said reinforcing section, and the penetration of said rubberized coating therein, is such that the structure of said further side of said reinforcing section remains visible.

5. A printing blanket according to claim 1, in which the coefficient of friction of that side of said printing blanket which is provided with said rubberized coating is 0.05 to 0.25 relative to steel.

6. A printing blanket according to claim 1, in which said rubberized coating is forced thoroughly into said further side of said reinforcing section by means of a dipping procedure prior to connection of said reinforcing section to said cover.

7. A printing blanket according to claim 1, in which said rubberized coating is forced thoroughly into said further side of said reinforcing section by means of a coating process.

8. A printing blanket according to claim 1, in which said rubberized coating is vulcanized at temperatures of between 80° and 160° C.

9. A printing blanket according to claim 1, in which said rubberized coating is vulcanized at room temperature.

10. A printing blanket according to claim 1, in which said rubberized coating, during vulcanization, is subjected to a pressure loading of approximately 20 to 40 $N/m^2$ to result in an evenness which positively affects the coefficient of glide.

11. A printing blanket according to claim 1, in which the rubber mixture of said rubberized coating, at the time of application to said reinforcing section, has a viscosity of from 20 to 50 Pascal. sec.

12. A printing blanket according to claim 1, in which the rubber mixture of said rubberized coating includes 0.5 to 5% silicon oil.

13. A printing blanket according to claim 1, in which said rubberized coating comprises a rubber composed on the basis of ethylenepropylene-diene-monomer elastomers for use of said printing blanket with inks having an ester or ketone base.

14. A printing blanket according to claim 1, in which several fabric layers of woven material are provided including an upper and lower fabric layer and having a respective rubberized layer disposed therebetween, said cover including a compression layer and a fabric layer as well as said top layer.

* * * * *